US012769659B2

(12) United States Patent
Ray

(10) Patent No.: US 12,769,659 B2
(45) Date of Patent: Oct. 20, 2026

(54) MANAGEMENT OF MULTIPLE CACHE LINE INVALIDATIONS

(71) Applicant: KALRAY, Montbonnot Saint Martin (FR)

(72) Inventor: Vincent Ray, Allevard (FR)

(73) Assignee: Kalray, Montbonnot Saint Martin (FR)

( * ) Notice: Subject to any disclaimer, the term of this patent is extended or adjusted under 35 U.S.C. 154(b) by 0 days.

(21) Appl. No.: 18/990,505

(22) Filed: Dec. 20, 2024

(65) Prior Publication Data

US 2025/0209002 A1 Jun. 26, 2025

(30) Foreign Application Priority Data

Dec. 22, 2023 (FR) ...................................... 2315090

(51) Int. Cl.
*G06F 12/0815* (2016.01)
*G06F 12/0817* (2016.01)

(52) U.S. Cl.
CPC ...... *G06F 12/0815* (2013.01); *G06F 12/0824* (2013.01); *G06F 2212/1016* (2013.01)

(58) Field of Classification Search
CPC ......... G06F 12/0815; G06F 2212/1016; G06F 12/0824; G06F 12/0833; G06F 12/0808; G06F 12/0817; G06F 12/0877
USPC .................................................. 711/141, 118
See application file for complete search history.

(56) References Cited

U.S. PATENT DOCUMENTS

| | | | | |
|---|---|---|---|---|
| 6,397,303 | B1 * | 5/2002 | Arimilli | G06F 12/0811 711/E12.024 |
| 6,701,417 | B2 | 3/2004 | Chaudhry | |
| 2009/0240889 | A1 * | 9/2009 | Choy | G06F 12/0815 711/E12.024 |
| 2010/0042771 | A1 * | 2/2010 | Kawaguchi | G06F 12/0808 711/E12.081 |
| 2014/0006720 | A1 * | 1/2014 | Hosokawa | G06F 12/0815 711/141 |
| 2017/0262369 | A1 * | 9/2017 | Murphy | G06F 12/084 |
| 2019/0266092 | A1 | 8/2019 | Robinson | |
| 2022/0214973 | A1 * | 7/2022 | Richardson | G06F 12/0808 |

OTHER PUBLICATIONS

French Preliminary Search Report in French Patent Application No. 2315090; Jun. 28, 2024; 16 pages.

* cited by examiner

*Primary Examiner* — Hosain T Alam
*Assistant Examiner* — Zubair Ahmed

(57) ABSTRACT

A processor comprising multiple cores, each including a local cache; multiple memory banks forming a shared memory for the multiple cores; a directory-based cache coherence protocol manager, comprising for each core a circuit for consolidating multiple cache line invalidation commands received from the different memory banks. The consolidation circuit comprises a counter for counting the received invalidation commands; and a selection circuit configured to, depending on whether the count of received invalidation commands is equal to 1 or greater, transmit to the cache the single received invalidation command or a consolidated invalidation command for the cache lines identified in the received invalidation commands, in a format usable by the cache to simultaneously invalidate the identified cache lines.

11 Claims, 2 Drawing Sheets

MANAGEMENT OF MULTIPLE CACHE LINE INVALIDATIONS

CROSS-REFERENCE TO RELATED APPLICATION

This application is based on and claims priority under 35 U.S.C. § 119 to French Patent Application No. 2315090 filed on Dec. 22, 2023, the disclosure of which is herein incorporated by reference in its entirety.

TECHNICAL FIELD

The disclosure relates to cache coherence management in a multicore processor system where the cores can simultaneously access different banks forming a shared memory.

BACKGROUND

There are several cache coherence protocols designed to ensure, in a multicore system, that the local cache of each processor core reflects the data updated in shared memory by other cores.

A commonly used operation in coherence protocols is the invalidation of cache lines. At a given time, there may be duplication of the same memory block, or cache line, in different local caches. If a core writes to memory at an address corresponding to this cache line, the copies in the other cores become obsolete.

To account for this, when a core writes to memory, the cache coherence protocol sends an invalidation command to the other cores possessing the corresponding cache line. This invalidation command instructs the local cache controllers to invalidate their local copies. A core accessing a cache line thus invalidated in its local cache will need to load the updated line again from memory.

To manage the sending of invalidation commands, the coherence protocol can be based on a directory where the memory controller records the cache lines used and the cores that have them in their caches.

When the shared memory is structured in multiple banks simultaneously accessible by all cores, each bank is likely to send a simultaneous invalidation command to the involved cores. Thus, a given core may receive multiple simultaneous invalidation commands. The processing of these multiple commands by the cache controller may result in a latency of several cycles during which the memory banks that sent these invalidation commands cannot normally acknowledge the write accesses that triggered these sends.

To avoid such latency, techniques have been proposed that allow the cache controller to process multiple invalidation commands simultaneously. An example of such a technique is described in U.S. Pat. No. 6,701,417, which uses a directory-based protocol and write-through caches. More specifically, this patent proposes to partition the local cache into multiple banks, each of which is designed to handle a respective invalidation command. Thus, the cache controller can simultaneously process at most as many invalidation commands as there are banks.

SUMMARY

A method is generally provided for managing cache coherence in a multicore processor system, wherein each core has a respective cache and accesses multiple banks of a memory shared between the cores, the method comprising the steps of managing a directory in each memory bank for implementing a directory-based cache coherence; writing to a current memory address by a core; searching the directory assigned to the current memory address for cores that possess a cache line matching the current memory address; sending respective cache line invalidation commands to the cores returned by the directory, the commands including the memory address of the cache line; and for each core, serving multiple invalidation commands received from different memory banks. The step of serving multiple invalidation commands comprises the steps of counting the number of invalidation commands received since a last clock cycle; when the count of invalidation commands received is one, transmitting the received invalidation command to the cache; and when the count of invalidation commands received is greater than one, transmitting to the cache a single command consolidating the cache lines identified in the received invalidation commands, in a format usable by the cache to simultaneously invalidate the identified cache lines.

Each core may have a respective set-associative multi-way cache, the method then further comprising the steps of recording in the directories the ways in which the caches store the cache lines; transmitting the ways in the invalidation commands sent to the cores; and including in the consolidated invalidation command, for each received invalidation command, a pair of coordinates including a set index, extracted from the memory address, and the way.

The method may comprise the step of responding to the consolidated invalidation command by the cache by simultaneously invalidating each cache line located at the intersection of the set and way determined by a respective pair of coordinates.

The step of serving multiple invalidation commands may comprise the steps of forming a bit mask comprising bits set to 1 at the positions identified by set indices extracted from the memory addresses of the received invalidation commands; when the count of invalidation commands received is greater than a threshold, including the bit mask in the consolidated invalidation command; and responding to the consolidated command by the cache by simultaneously invalidating the cache sets marked in the bit mask.

The directory may record the cores and ways for each cache line in the form of a compound bit mask marking the cores having the line in their cache and the ways in which the line is present in the caches of those cores, and the way information transmitted in the invalidation commands may include the bits of the compound bit mask identifying the ways.

The consolidated invalidation commands may be configured to convey a field comprising a fixed number of bits, among which: a first part identifies a command type among an original invalidation command, a consolidated command with coordinates, and a consolidated command with a bit mask, and a second part defines for the respective types: the address of the cache line, the pairs of coordinates, and the bit mask.

A processor is generally provided, comprising multiple cores, each including a local cache; multiple memory banks forming a shared memory for the multiple cores; a directory-based cache coherence protocol manager, comprising for each core a circuit for consolidating multiple cache line invalidation commands received from the different memory banks. The consolidation circuit comprises a counter for counting the received invalidation commands; and a selection circuit configured to, depending on whether the count of received invalidation commands is equal to 1 or greater, transmit to the cache the single received invalidation command or a consolidated invalidation command for the cache lines identified in the received invalidation commands, in a format usable by the cache to simultaneously invalidate the identified cache lines.

Each core may have a respective set-associative multi-way cache, the processor further comprising a directory associated with each memory bank, configured to record with each cache line, the ways in which the cache line is present in the different cores and to include the ways in the invalidation commands sent to the cores; and the consolidation circuit configured to include in the consolidated invalidation command, for each received cache line invalidation command, a pair of coordinates including a set index, extracted from a memory address of the cache line, and the way.

The consolidation circuit may be configured to include in the consolidated invalidation command, when the count of received invalidation commands is greater than a threshold, a bit mask marking cache sets to invalidate, wherein each set includes the cache line identified by a respective received invalidation command.

An alternative method may be provided for managing cache coherence in a multicore processor system, wherein each core has a respective set-associative multi-way cache, and accesses multiple banks of a memory shared between the cores, the method comprising the steps of managing a directory in each memory bank for implementing a directory-based cache coherence; writing to a current memory address by a core; searching the directory assigned to the current memory address for the cores that possess a cache line matching the current memory address; sending respective cache line invalidation commands to the cores returned by the directory, the commands including the memory address of the cache line; for each core, serving multiple invalidation commands received from different memory banks; recording in the directories the ways in which the caches store the cache lines; transmitting the ways in the invalidation commands sent to the cores; serving the multiple invalidation commands received by a core by transmitting to the core's cache a single consolidated command including, for each received invalidation command, a pair of coordinates including a set index, extracted from the memory address of the cache line, and the way; and responding by a cache to a consolidated invalidation command by simultaneously invalidating each cache line located at the intersection of the set and way determined by a respective pair of coordinates.

The step of serving multiple invalidation commands may comprise the steps of counting the number of invalidation commands received since a last clock cycle; forming a bit mask comprising bits set to 1 at the positions identified by the set indices; when the count of received invalidation commands is greater than a threshold, including the bit mask in the consolidated invalidation command in place of the pairs of coordinates; and responding by the cache to the consolidated command by simultaneously invalidating the cache sets marked in the bit mask.

BRIEF DESCRIPTION OF THE DRAWINGS

Embodiments will be set forth in the following non-limiting description in relation to the accompanying drawings, among which.

DETAILED DESCRIPTION

Figure 1:
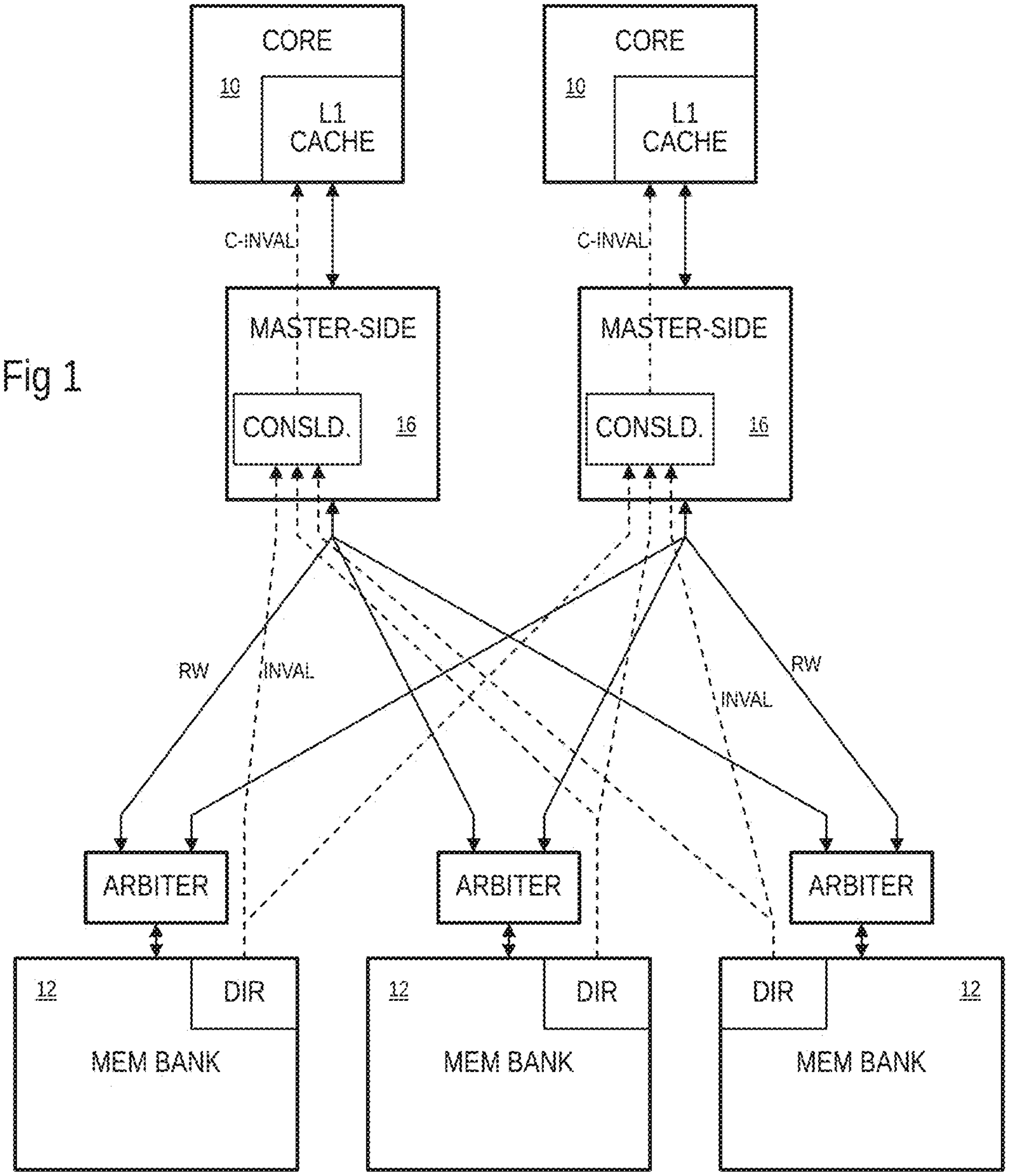
FIG. 1 partially represents an embodiment of a multicore processor architecture configured to implement a directory-based cache coherence protocol.

The cache coherence protocol described in U.S. Pat. No. 6,701,417 requires a specific cache structure and the number of invalidation commands that can be processed simultaneously is limited to the number of banks in the cache, in practice four.

A cache coherence protocol is disclosed below with which the cache controller can simultaneously process all invalidation commands that are likely to arrive, at the cost of a performance trade-off from a threshold number of commands processed simultaneously. In the worst case, the trade-off is, for a set-associative multi-way cache, the coarse invalidation of an entire set of cache lines, instead of invalidating a single cache line.

The notion of simultaneous processing of multiple invalidation commands is relative to a clock cycle of the cores. In practice, the processing is performed asynchronously by combinatorial logic circuits that produce the desired operations with more or less delay depending on the situation, but which remains less than a clock period.

Moreover, the protocol is adaptive by operating a selection between several modes depending on the number of invalidation commands to be processed. In the first mode, selected for a single command to be processed, a conventional, precise invalidation command may be used, allowing to identify the involved cache line and to invalidate it only if it is still present in the cache, namely listed in the cache tag memory.

In a coarse mode, which may be selected for any number of commands to be processed, a consolidated command is produced that simultaneously invalidates the sets containing the involved cache lines.

An intermediate, finer mode is preferably used up to a certain threshold of number of commands to be processed, producing a consolidated invalidation command that identifies each cache line by a pair of coordinates (set containing the line, way containing the line). The cache controller then simultaneously invalidates all the lines identified by these pairs of coordinates. The presence of these lines in the cache is then not checked, which is a small price to pay for the possibility of simultaneously processing these multiple invalidation commands. In practice, the invalidation of an absent cache line causes the invalidation of a memory location intended to contain a cache line. This location may be empty, in which case it is already invalid and the operation has no effect. The location may also contain a new cache line, in which case this new line is invalidated for nothing, but this simply results in a subsequent latency to reload the line when the core attempts to access it.

The number of invalidations that can be processed in this mode depends on the size of a parameter of the consolidated command, which size conditions the number of pairs of coordinates that can be conveyed.

The efficiency of this protocol, in terms of granularity in the selection of cache lines to invalidate, is related to the frequency of cases where bursts of multiple simultaneous invalidation commands occur, and the number of commands to be processed in each burst. It turns out in practice that cases where only one invalidation command is to be processed are more frequent than bursts of several commands. Moreover, bursts with a small number of commands (for example between 2 and 4) are more frequent than those with a larger number of commands.

FIG. 1 partially represents a multicore processor architecture usable for implementing such a directory-based cache coherence protocol. Two processor cores 10 have simultaneous read and write RW access to multiple banks 12 (of which only three are represented) of a shared memory through a crossbar switch managed by arbiters ARBITER. Each core includes a level 1 local cache L1.

Cache coherence is managed by a directory DIR that may be centralized or distributed, as shown, in each memory bank 12. The directories are configured to record the cache lines currently in use in each core. Each directory DIR associated with a bank only lists the cache lines corresponding to the physical addresses assigned to the bank. The directories communicate with the cores via respective "master-sides" 16, which may be part of the L1 caches or the crossbar switch. The master sides are connected to the directories DIR by point-to-point signaling links, represented by dashed lines.

In a conventional manner, a directory receives a new record each time a core misses a read in its cache and retrieves the cache line in the corresponding bank. The new record identifies the cache line and the core. A record is kept in the directory until that cache line is invalidated. Thus, directory information may be obsolete in between.

Directory records are typically stored in an associative memory indexed by the physical addresses of the cache lines.

When a given core writes to a memory line subject to coherence, this event is signaled to the directories. The directory that is responsible for managing the coherence of this address then issues an invalidation INVAL to the other cores registered as possessing this cache line.

In order to manage multiple invalidations simultaneously according to the previously mentioned adaptive mode, each master side includes a consolidation circuit CONSLD receiving individual invalidation commands from all directories. From the individual invalidation commands, this circuit produces a consolidated invalidation command C-INVAL to the corresponding L1 cache memory.

As previously indicated, the consolidated command may be of two, or preferably three types: PRECISE, ARRAY_OF_SLOTS, and MASK_OF_SETS.

Figure 2A:
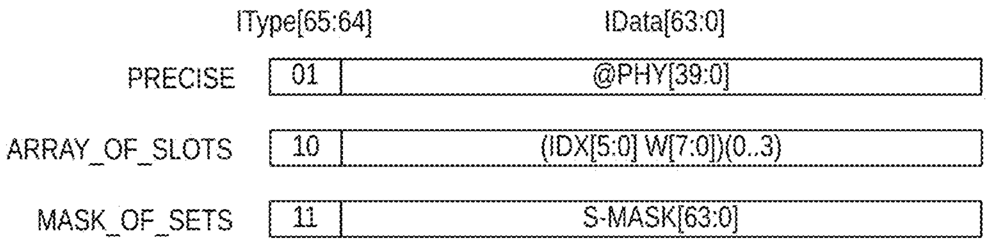
FIG. 2A represents three types of consolidated invalidation commands, according to an embodiment, allowing a cache controller to simultaneously invalidate multiple cache lines.

FIG. 2A illustrates an example of formats for the three types of consolidated commands, assuming for example that physical memory addresses are 40 bits and the cache is a set-associative cache with 64 sets of 8 ways whose lines are 64 bytes long (i.e., a 32 kB cache).

Each consolidated command comprises two type identifier bits IType[65:64] followed by a 64-bit field IData[63:0] whose function depends on the type. A binary identifier "00" indicates that there is no invalidation to be processed.

The binary identifier 01 corresponds to the PRECISE type. This consolidated command is produced when only one invalidation command is pending from the last clock cycle. It provides in its IData field what is normally provided by the single incoming invalidation command, namely the physical address @PHY[39:0] used for the memory access. In principle, a certain number of least significant bits of the physical address, called the offset and defining the position of the data in a cache line, are not useful, so that 6 least significant bits can be removed here and only @PHY[39:6] may be used. In the thus truncated address, the 6 least significant bits [11:6] constitute what is called the index, and serve to identify the set containing the cache line. The remaining significant bits [39:12] are what is called the tag, with which the cache tag memory is consulted, which identifies amongst others the way containing the cache line. If the tag memory does not provide a corresponding value, it is because the cache line has been evicted after the directory issued the invalidation command.

A PRECISE consolidated command is processed by the cache controller like a conventional invalidation command, invalidating the unequivocally identified cache line.

The binary identifier "10" corresponds to the ARRAY_OF_SLOTS type. This consolidated command is produced when two or more invalidation commands are received simultaneously in the same clock cycle. The number of commands that can be processed simultaneously is limited by the size of the IData field, here 64 bits. This IData field conveys in this example four 14-bit data items used to identify four cache lines to invalidate. The 56 bits corresponding to these data items may be right-aligned in the IData field. Each 14-bit data item corresponds to a pair of coordinates, namely in this example a 6-bit index IDX[5:0] and an 8-bit way W[7:0]. The cache line to invalidate is therefore located at the intersection of the set identified by the index IDX and the way identified by the field W.

For reasons discussed later, the W field is in this example an 8-bit mask, identifying one to eight ways by the positions of bits at 1. According to an alternative, the way number may be encoded on 3 bits, in which case the IData field could contain 7 pairs of coordinates.

The indices IDX correspond in this example to the bits [11:6] of the respective physical addresses provided by the incoming individual invalidation commands. If fewer than four invalidation commands are to be processed, the masks W associated with the missing commands may be set to 0, indicating that they will be ignored.

As for the values of the W fields identifying the ways, the directories DIR are configured to further record the ways in which the lines are stored in the caches, and also to broadcast these ways in the invalidation commands. These ways broadcast in the invalidation commands are then copied in the W fields of the ARRAY_OF_SLOTS consolidated invalidation command.

At the level of the directories DIR, ideally each cache line is recorded with the cores that possess it and, for each core, the way in which it is located. This may represent a significant number of bits to manipulate for each line in a system with a large number of cores. For example, for 16 cores with 8-way caches, 16 3-bit fields would be needed, i.e., 48 bits, to encode one way among 8 for each of the 16 cores.

Figure 2B:
FIG. 2B represents an example of a record in a directory used for a cache coherence protocol.

FIG. 2B illustrates an embodiment of a directory record reducing complexity and hardware cost, with the trade-off of a reduced accuracy of the way identification. In each directory, a core mask CORE[15:0] with a bit for each core and a way mask W[7:0] with a bit for each way are managed for each recorded cache line @PHY[39:6]. This reduces the number of bits to 24 for a system of 16 cores with 8-way caches. It is then the way mask W of this record that is transmitted in the corresponding invalidation command.

With such way masks, if several cores use the same cache line but that line is stored in a different way in each core, the way mask for that cache line would have several bits set to 1.

The cache controller is configured to process such a consolidated command by reading each pair of coordinates (IDX, W) and, for each pair, invalidating the cache lines located at the intersection of the set identified by IDX and the ways marked in W. If the way mask W contains more than one bit set to 1, additional cache lines, if they exist in the cache, will be unnecessarily invalidated, but this is the price to pay for simplifying the structure of the directories. In practice, situations where more than one way is marked in a way mask are infrequent.

The invalidation of a cache line by the cache controller may be conventionally performed by toggling a validity flag in a matrix of flip-flops representing the intersections of the sets and ways of the cache. Each of these flip-flops is individually accessible by the logic circuits of the controller, so that these circuits may be configured to toggle any number of flags simultaneously. Once a flag is thus set to the "invalid" state, a subsequent read access by the core to that location fails after checking the flag ("cache miss") and is routed to shared memory to reload an updated cache line.

The binary identifier "11" corresponds to the MASK_OF_SETS type. This consolidated command is produced when the number of invalidations to be processed exceeds the number of commands that a consolidated ARRAY_OF_SLOTS command can handle, namely 4 in the present example. The IData field is then a mask of sets S-MASK [63:0] where each bit at 1 indicates that the set corresponding to the position of the bit in the mask is to be invalidated. Thus, the size of the IData field is at least equal to the number of sets in the cache, 64 in the present example.

To generate the S-MASK, the index fields of the physical addresses of the pending invalidation commands are used, namely the values @PHY[11:6]. The values @PHY[11:6] determine the positions of the bits to be set to 1 in the S-MASK. This S-MASK may then be exploited by the cache controller to simultaneously invalidate all the sets marked in this mask.

Figure 3:
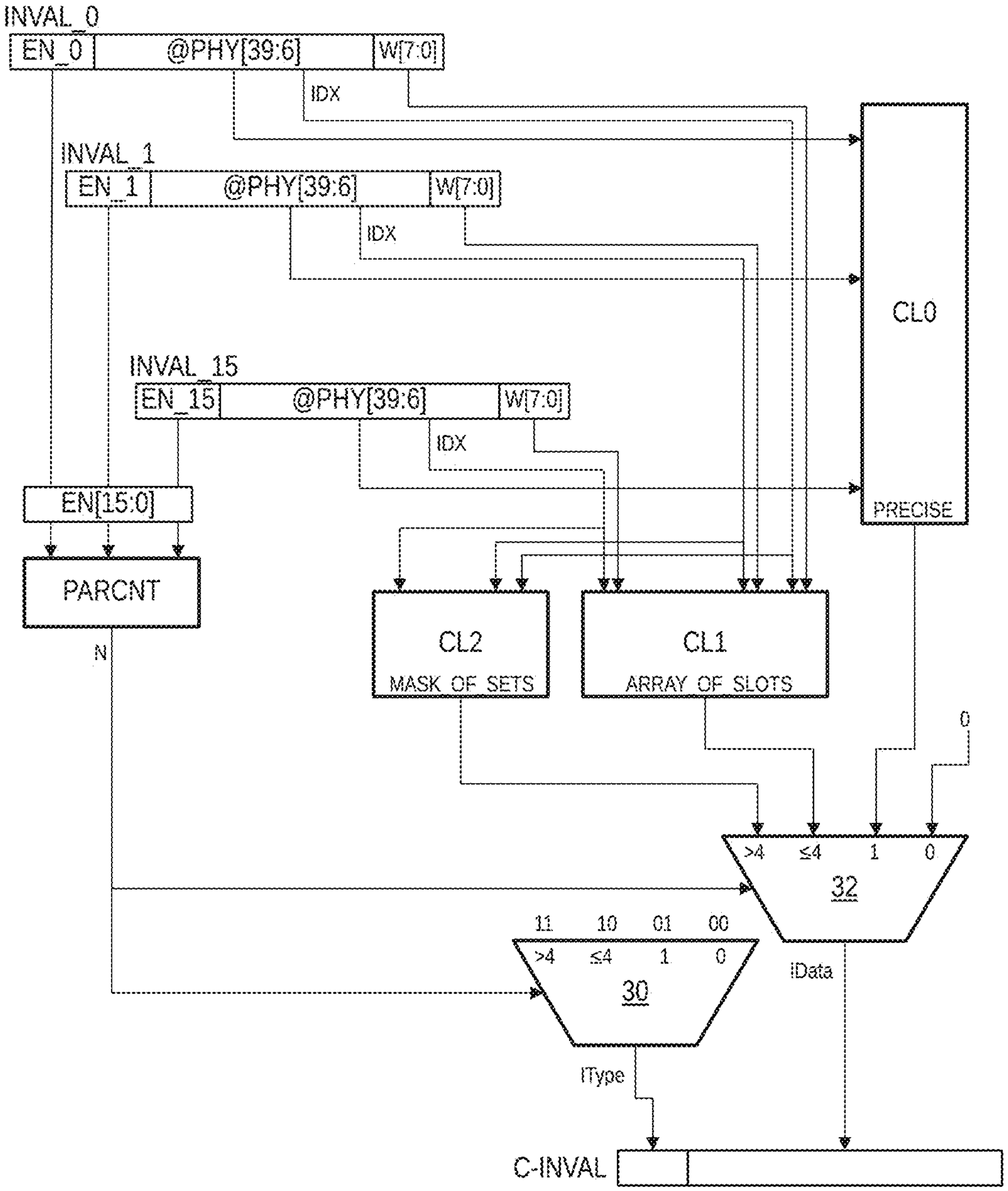
FIG. 3 is a block diagram of a logic circuit configured to generate the consolidated commands of FIG. 2A.

FIG. 3 is a block diagram of a logic circuit configured to generate the consolidated commands, in particular the content of the IData field of each type of consolidated command. Such a circuit may be integrated into each master side, at the level of the block CONSLD of FIG. 1. The circuit operates on all point-to-point connections between the master side and the directories of the memory banks.

From each of the memory banks, 16 in this example, the circuit receives a bundle of conductors INVAL_i used to transmit an invalidation command. One conductor carries a flag EN_i indicating the presence of an invalidation command, the following conductors convey the address of the cache line to be invalidated @PHY[39:6], and the last conductors convey the way mask W[7:0]. The flags EN_i are provided to individual inputs of a parallel counter PARCNT that provides the number of active commands N at any given time. The concatenation of these flags forms a 16-bit mask of active commands EN[15:0]. The count N controls two 4-way multiplexers 30, 32 which produce respectively the IType and IData parameters of the consolidated invalidation command C-INVAL.

When N=0, multiplexer 30 selects the binary value "00" for IType, and multiplexer 32 selects the value 0 for IData.

When N=1, multiplexer 30 selects the binary value "01" for IType, and multiplexer 32 selects the output of a combinatorial logic circuit CL0 for IData.

Circuit CL0 receives all cache line addresses @PHY[39:6] and transmits the one for which the EN_i flag is active.

When 1<N≤4, multiplexer 30 selects the binary value "10" for IType, and multiplexer 32 selects the output of a combinatorial logic circuit CL1 for IData.

Circuit CL1 receives all index values IDX contained in the least significant bits of the cache line addresses, namely bits @PHY[11:6] in this example, and also receives the way masks W. The circuit forms pairs of values (index IDX, way mask W) for only the values that have an active EN_i flag, and positions them in 56 bits used to form the IData field.

When N>4, multiplexer 30 selects the binary value "11" for IType, and multiplexer 32 selects the output of a combinatorial logic circuit CL2 for IData.

Circuit CL2 receives all index values IDX contained in the cache line addresses, namely bits @PHY[11:6] in this example. The circuit forms a 64-bit mask by setting to 1 all bits at positions determined by the indices whose EN_i flag is active.

According to an alternative for the PRECISE consolidated invalidation command, provided the directories store and transmit the way information W, circuit CL0 may be designed simply to extract the (IDX, W) pair from the single invalidation command received, actually forming a special case of an ARRAY_OF_SLOTS command. This saves one clock cycle required to consult the cache tag memory, at the risk of invalidating "for nothing" an evicted cache line or additional cache lines if the W mask marks several ways. Such an alternative is in fact implemented by omitting circuit CL0 and using circuit CL1 for counts N between 1 and 4.

The invention claimed is:

1. A method for managing cache coherence in a multicore processor system, wherein each core has a respective cache and accesses multiple banks of a memory shared between the cores, the method comprising the steps of:
- managing a directory in each memory bank for implementing a directory-based cache coherence;
- writing to a current memory address by a core;
- searching the directory assigned to the current memory address for cores that possess a cache line matching the current memory address;
- sending respective cache line invalidation commands to the cores returned by the directory, the commands including the memory address of the cache line; and
- for each core, serving multiple invalidation commands received from different memory banks;
- wherein the step of serving multiple invalidation commands comprises the steps of:
  - counting a number of invalidation commands received since a last clock cycle;
  - when the count of invalidation commands received is one, transmitting the received invalidation command to the cache; and
  - when the count of invalidation commands received is greater than one, transmitting to the cache a single command consolidating the cache lines identified in the received invalidation commands, in a format usable by the cache to simultaneously invalidate the identified cache lines.

2. The method according to claim 1, wherein each core has a respective set-associative multi-way cache, the method further comprising the steps of:
- recording in the directories the ways in which the caches store the cache lines;
- transmitting the ways in the invalidation commands sent to the cores; and
- including in the consolidated invalidation command, for each received invalidation command, a pair of coordinates including a set index, extracted from the memory address, and the way.

3. The method according to claim 2, comprising the step of responding to the consolidated invalidation command by the cache by simultaneously invalidating each cache line located at an intersection of the set and way determined by a respective pair of coordinates.

4. The method according to claim 2, wherein the step of serving multiple invalidation commands comprises the steps of:

forming a bit mask comprising bits set to 1 at positions identified by set indices extracted from the memory addresses of the received invalidation commands;

when the count of invalidation commands received is greater than a threshold, including the bit mask in the consolidated invalidation command; and responding to the consolidated command by the cache by simultaneously invalidating the cache sets marked in the bit mask.

5. The method according to claim 2, wherein the directory records the cores and ways for each cache line in the form of a compound bit mask marking the cores having the line in their cache and the ways in which the line is present in the caches of those cores, and way information transmitted in the invalidation commands includes the bits of the compound bit mask identifying the ways.

6. The method according to claim 2, wherein the consolidated invalidation command is configured to convey a field comprising a fixed number of bits, among which:

a first part identifies a command type among an original invalidation command, a consolidated command with coordinates, and a consolidated command with a bit mask, and a second part defines for the respective types: the address of the cache line, the pairs of coordinates, and the bit mask.

7. A processor comprising:

multiple cores, each including a local cache;

multiple memory banks forming a shared memory for the multiple cores;

a directory-based cache coherence protocol manager, comprising for each core a circuit for consolidating multiple cache line invalidation commands received from the memory banks, the consolidation circuit comprising:

a counter for counting the received invalidation commands; and a selection circuit configured to, depending on whether the count of received invalidation commands is equal to 1 or greater, transmit to the cache a single received invalidation command or a consolidated invalidation command for the cache lines identified in the received invalidation commands, in a format usable by the cache to simultaneously invalidate the identified cache lines.

8. The processor according to claim 7, wherein each core has a respective set-associative multi-way cache, the processor further comprising:

a directory associated with each memory bank, configured to record with each cache line, the ways in which the cache line is present in the cores and to include the ways in the invalidation commands sent to the cores; and the consolidation circuit configured to include in the consolidated invalidation command, for each received cache line invalidation command, a pair of coordinates including a set index, extracted from a memory address of the cache line, and the way.

9. The processor according to claim 8, wherein the consolidation circuit is configured to include in the consolidated invalidation command, when the count of received invalidation commands is greater than a threshold, a bit mask marking cache sets to invalidate, wherein each set includes the cache line identified by a respective received invalidation command.

10. A method for managing cache coherence in a multi-core processor system, wherein each core has a respective set-associative multi-way cache, and accesses multiple banks of a memory shared between the cores, the method comprising the steps of:

managing a directory in each memory bank for implementing a directory-based cache coherence;

writing to a current memory address by a core;

searching the directory assigned to the current memory address for the cores that possess a cache line matching the current memory address;

sending respective cache line invalidation commands to the cores returned by the directory, the commands including the memory address of the cache line;

for each core, serving multiple invalidation commands received from different memory banks;

recording in the directories the ways in which the caches store the cache lines;

transmitting the ways in the invalidation commands sent to the cores;

serving the multiple invalidation commands received by a core by transmitting to the core's cache a single consolidated command including, for each received invalidation command, a pair of coordinates including a set index, extracted from the memory address of the cache line, and the way; and responding by a cache to a consolidated invalidation command by simultaneously invalidating each cache line located at an intersection of the set and way determined by a respective pair of coordinates.

11. The method according to claim 10, wherein the step of serving multiple invalidation commands comprises the steps of:

counting a number of invalidation commands received since a last clock cycle;

forming a bit mask comprising bits set to 1 at positions identified by the set index;

when the count of received invalidation commands is greater than a threshold, including the bit mask in the consolidated invalidation command in place of the pairs of coordinates; and responding by the cache to the consolidated command by simultaneously invalidating the cache sets marked in the bit mask.

* * * * *